US012044361B2

(12) United States Patent
Al-Ghamdi

(10) Patent No.: US 12,044,361 B2
(45) Date of Patent: Jul. 23, 2024

(54) RISK-FREE RELIEF VALVE DEPRESSURIZATION

(71) Applicant: SAUDI ARABIAN OIL COMPANY, Dhahran (SA)

(72) Inventor: Raed S. Al-Ghamdi, Riyadh (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 220 days.

(21) Appl. No.: 17/643,725

(22) Filed: Dec. 10, 2021

(65) Prior Publication Data

US 2023/0184387 A1 Jun. 15, 2023

(51) Int. Cl.
*F17C 13/04* (2006.01)

(52) U.S. Cl.
CPC ...... *F17C 13/04* (2013.01); *F17C 2205/0311* (2013.01); *F17C 2205/0332* (2013.01); *F17C 2205/0352* (2013.01); *F17C 2205/0382* (2013.01)

(58) Field of Classification Search
None
See application file for complete search history.

(56) References Cited

U.S. PATENT DOCUMENTS 5,590,684 A 1/1997 Alberts et al.
6,209,577 B1 4/2001 Lai et al.
6,505,501 B1 * 1/2003 Murphy .............. F16K 37/0091 73/37
8,944,100 B2 2/2015 Pifer
10,386,005 B2 * 8/2019 Flanders .................. F17D 5/00
2011/0031195 A1 * 2/2011 Wilkinson ............ B08B 9/0321 210/801

FOREIGN PATENT DOCUMENTS

CN 205191200 U * 4/2016
JP 4308507 B2 8/2009
WO 2002038994 A1 5/2002

* cited by examiner

*Primary Examiner* — Angelisa L. Hicks
(74) *Attorney, Agent, or Firm* — Osha Bergman Watanabe & Burton LLP

(57) ABSTRACT

A system includes a pressure relief valve connected between an upstream segment of pipe and a downstream segment of pipe, an inlet isolation valve located in the upstream segment of pipe, an outlet isolation valve located in the downstream segment of pipe, and a tubing having a first tubing isolation valve, a first end connected to the upstream segment of pipe between the inlet isolation valve and the pressure relief valve, and a second end connected to the downstream segment of pipe between the pressure relief valve and the outlet isolation valve. Depressurizing the system includes closing the inlet isolation valve, depressurizing the upstream segment of pipe by opening the first tubing isolation valve, monitoring a pressure in the tubing with a gauge connected to the tubing, and closing the outlet isolation valve when the pressure in the tubing is below a predetermined pressure.

11 Claims, 2 Drawing Sheets

RISK-FREE RELIEF VALVE DEPRESSURIZATION

BACKGROUND

Pressure relief valves are used in various industries to protect equipment and personnel from adverse impacts of excessive or sudden increases in pressure in a flow line. To ensure proper function and operation of pressure relief valves, the valves are inspected and tested. Inspection and testing of pressure relief valves includes isolation of the pressure relief valve which may be done by closing valves upstream and downstream of the pressure relief valve.

Periodic punch-test inspections of pressure relief valves may be done to maintain reliability of the valves which are often important safety instruments in a system. In current industry practice, operators in full personal protective equipment close valves downstream and upstream of the pressure relief valve and vent gases directly from the flowlines to atmosphere.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a pressure relief valve system including a pressure relief valve connected between an upstream segment of pipe and a downstream segment of pipe, an inlet isolation valve located in the upstream segment of pipe, an outlet isolation valve located in the downstream segment of pipe, and a tubing having a first end connected to the upstream segment of pipe between the inlet isolation valve and the pressure relief valve and a second end connected to the downstream segment of pipe between the pressure relief valve and the outlet isolation valve, the tubing having a first tubing isolation valve.

In another aspect, embodiments disclosed herein relate to a method of depressurizing a pressure relief valve including closing an inlet isolation valve of a pressure relief valve system located in an upstream segment of pipe connected to an inlet of the pressure relief valve, depressurizing the upstream segment of pipe, the depressurizing including opening a first tubing isolation valve located in a tubing having a first end connected to the upstream segment of pipe between the inlet isolation valve and the pressure relief valve and a second end connected to a downstream segment of pipe connected to an outlet of the pressure relief valve, monitoring a pressure in the tubing with a gauge connected to the tubing between the first tubing isolation valve and the second end of the tubing, and closing an outlet isolation valve of the pressure relief valve system located in the downstream segment of pipe when the pressure in the tubing is below a predetermined pressure.

In another aspect, embodiments disclosed herein relate to a method comprising connecting an upstream segment of pipe to an inlet of a pressure relief valve, connecting an inlet isolation valve to the upstream segment of pipe, connecting a downstream segment of pipe to an outlet of the pressure relief valve, connecting an outlet isolation valve to the downstream segment of pipe, connecting a first end of a tubing to the upstream segment of pipe between the inlet isolation valve and the pressure relief valve, connecting a second end of the tubing to the downstream segment of pipe between the outlet isolation valve and the pressure relief valve, and connecting a first tubing isolation valve to the tubing.

Other aspects and advantages of the claimed subject matter will be apparent from the following description and the appended claims.

BRIEF DESCRIPTION OF DRAWINGS

The following figures are included to illustrate certain aspects of the embodiments, and should not be viewed as exclusive embodiments. The subject matter disclosed is amenable to considerable modifications, alterations, combinations, and equivalents in form and function, as will occur to those skilled in the art and having the benefit of this disclosure.

DETAILED DESCRIPTION

In one aspect, embodiments disclosed herein relate to a pressure relief valve system. Specifically, embodiments disclosed herein relate to a pressure relief valve system and methods for operating a pressure relief valve that allows for depressurization of the pressure relief valve when isolated. Thus, embodiments disclosed herein provide a pressure relief valve system and methods that may reduce risks associated with isolation of safety relief valves.

In another aspect, embodiments disclosed herein relate to a method of depressurizing a pressure relief valve. Specifically, embodiments disclosed herein provide a method of depressurizing a pressure relief valve that has been isolated. Isolation of pressure relieve valves may result in trapped gases or fluids in a pipe system. Embodiments disclosed herein provide a method of releasing the trapped gases or fluids from an upstream, high-pressure side of a pressure relief valve to a downstream low-pressure side of the pressure relief valve for safe disposal.

Inspection and testing of pressure relief valves to ensure proper function of the valves may require isolation of the pressure relief valve from the rest of a system. Embodiments disclosed herein provide a system and method for isolating a pressure relief valve and depressurizing the isolated pressure relief valve. More specifically, embodiments disclosed herein provide a system and method for depressurizing an isolated pressure relief valve such that any gas or fluid trapped upstream of the pressure relief valve when isolated from the system may be safely sent to a low pressure flaring system on a downstream side of the pressure relief valve for safe disposal.

Figure 1:
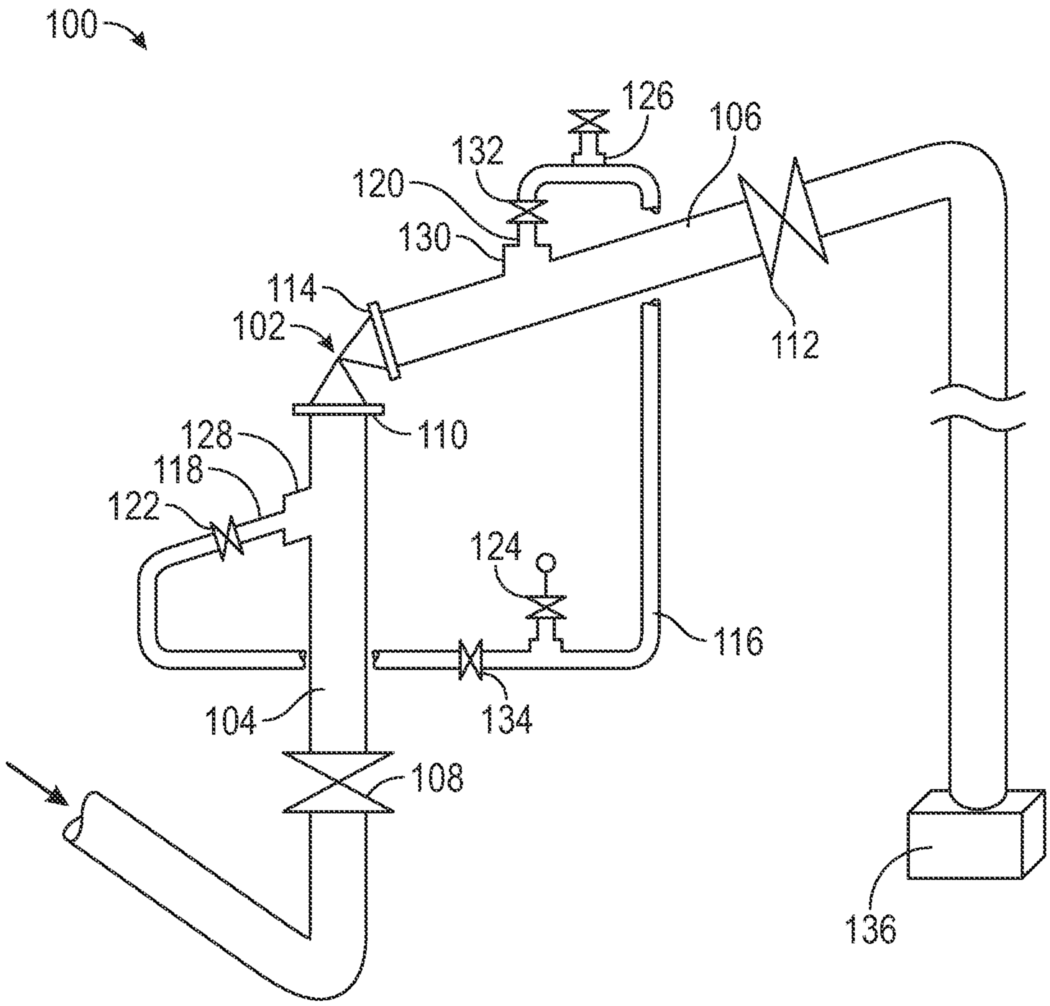
FIG. 1 is a schematic of a pressure relief system in accordance with embodiments disclosed herein.

Referring to FIG. 1, a schematic of a pressure relief valve system 100 is shown. The pressure relief valve system 100 includes a pressure relief valve 102 connected between an upstream segment of pipe 104 and a downstream segment of pipe 106. One of ordinary skill in the art will appreciate that the configuration of the upstream and downstream segments of pipe 104, 106 and the pressure relief valve 102 may vary without departing from the scope of the present application. Further, pressure relief valve 102 may be any valve known in the art, including, for example, angle valves, breather valves, pilot operate relief valves, and pneumatic closure valves. The pressure relief valve 102 may be configured to open proportional to an increase in pressure in the pipe or flowline. In one or more embodiments, the pressure relief valve 102 is a safety valve and, therefore, may be configured to open fully when a set pressure is reached.

The pressure relief valve system 100 also includes an inlet isolation valve 108 located in the upstream segment of pipe 104 configured to control a flow of fluid to the inlet 110 of the pressure relief valve 102. In one or more embodiments, the pressure relief valve system 100 also includes an outlet isolation valve 112 located in the downstream segment of pipe 106 and configured to control a flow of fluid out of an outlet 114 of the pressure relief valve 102. The inlet isolation valve 108 and/or outlet isolation valve may be closed to isolate the pressure relief valve 102 from upstream or downstream equipment, flowlines, etc. By isolating the pressure relief valve 102 from the rest of a system or other equipment or flowline, the pressure relief valve 102 may be inspected, tested, repaired, or replaced. Inlet isolation valve 108 and outlet isolation valve 112 may be any valve known in the art to close and open a flowline, such as gate valves, butterfly valves, ball valves, etc.

As shown in FIG. 1, pressure relief valve system 100 further includes a tubing 116 connected between the upstream segment of pipe 104 and the downstream side of pipe 106. Specifically, a first end 118 of the tubing 116 is connected to the upstream segment of pipe 106 and a second end 120 of the tubing 116 is connected to the downstream segment of pipe 106 to allow for fluid communication between the upstream segment of pipe 104 and the downstream segment of the pipe 106 bypassing the pressure relief valve 102. The tubing 116 may be a section of pipe having a diameter smaller than a diameter of the upstream segment of pipe 104 and smaller than a diameter of the downstream segment of pipe 106. The shape or configuration of the tubing 116 may vary depending on, for example, the shape and configuration of the upstream segment of pipe 104, the downstream segment of pipe 106, the available space on site, and flowrate considerations.

The tubing 116 includes a first tubing isolation valve 122 that may be opened or close to allow or restrict fluid flow through the tubing 116. The first tubing isolation valve 122 may be located proximate a connection 128 of the first end of the tubing to the upstream segment of pipe 104. Thus, first tubing isolation valve 122 may be operated to allow fluid from the upstream segment of pipe 104 to the downstream segment of pipe 106 and to provide depressurization of the pressure relief valve 102.

In one or more embodiments, the tubing 116 also includes a gauge 124. In one embodiment, gauge 124 is a pressure gauge configured to measure a pressure of fluid flowing through the tubing 116 from the upstream segment of pipe 104 to the downstream segment of pipe 106. As discussed below, the first tubing isolation valve 122 may be opened to depressurize the pressure relief valve 102 (after inlet isolation valve 108 is closed) and, thus, the gauge 124 may be configured to measure the pressure in the tubing 116 in real time to show decreases in pressure in tubing 116 as the upstream segment of pipe 104 is depressurized.

In one or more embodiments, the tubing 116 may also include a vent 126. The vent 126 may be located proximate a connection 130 of the second end 120 of the tubing 116 to the downstream segment of pipe 106. The vent 126 may be located downstream of the gauge 124 such that the vent 126 is located between the gauge 124 and the connection 130 second end 120 of the tubing 116 to the downstream segment of pipe 106. In one or more embodiments, the vent 126 may be a gate valve. In some embodiments, the vent 126 may be a globe valve.

Upon depressurization of the pressure relief valve 102 and pressure relief valve system 100, inlet isolation valve 108 may be closed, then the first tubing isolation valve 122 is opened, thereby allowing gas to flow through the first tubing isolation valve 122 towards the outlet isolation valve 112 and then to a flaring system 136. Once pressure in the upstream segment of pipe 104 between inlet isolation valve 108 and the pressure relief valve 102 is equal to pressure at an inlet to the flaring system 136, the valve outlet isolation valve 112 is closed and the vent 126 is opened.

Tubing 116 may also include one or more additional isolation valves, such as a second tubing isolation valve 132 located between the connection 130 of the second end of the tubing 116 to the downstream segment of pipe 106 and the vent 126. Thus, the second tubing isolation valve 132 may be operated to allow fluid from the tubing 116 to the downstream segment of pipe 106. When closed, the second tubing isolation valve 132 restricts fluid flow into the downstream segment of pipe 106 and may increase pressure in the tubing 116.

Tubing 116 may also include a third tubing isolation valve 134 located between the first tubing isolation valve 122 and the gauge 124. The third tubing isolation valve 134 may be configured to provide redundancy to first tubing isolation valve 122 or to control a flow of fluid to the gauge 124 to ensure correct pressure measurement of fluid in the tubing 116. First, second and third tubing isolation valves 122, 132, 134 may be any valve known in the art such as gate valves, ball valves, butterfly valves, etc.

In one or more embodiments, pressure relief valve system 100 may also include flaring system 136 coupled to a downstream end of the downstream segment of pipe 106. The flaring system 136 is configured to receive a flow of gas from the downstream segment of pipe 106, and in some instances a flow of gas from the tubing 116 through the downstream segment of pipe 106 and safely dispose of the gas by flaring.

Figure 2:
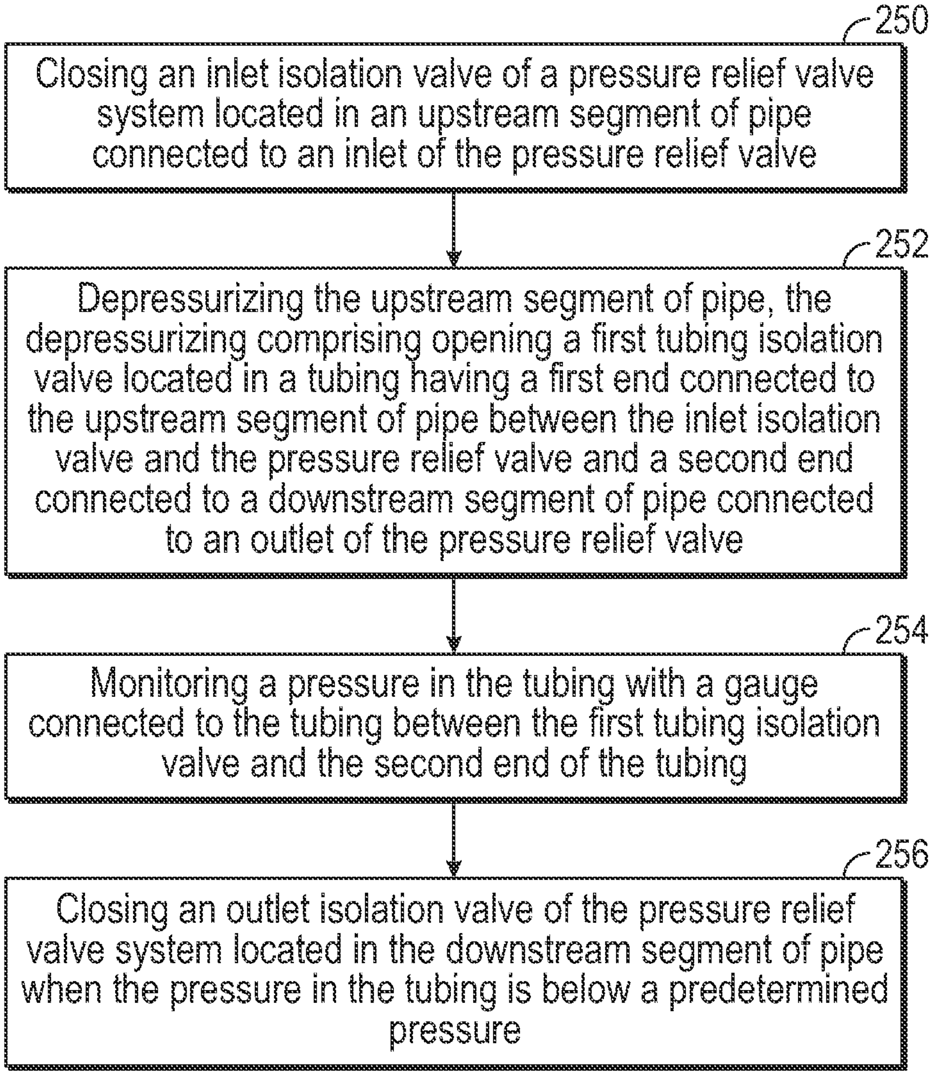
FIG. 2 shows a method of depressurizing a pressure relief valve in accordance with embodiments disclosed herein.

As discussed above, a pressure relief valve may be isolated from a flowline, equipment, or system in which it is installed to perform inspections, testing, repairs, or replacement of the pressure relief valve. To isolate the pressure relief valves, the flowline upstream of the pressure relief valve is closed. The flowline downstream of the pressure relief valve may also be closed simultaneously or after the flowline upstream of the pressure relief valve is closed. Closing of the flowline upstream of the pressure relief valve may cause gas to be trapped in the flow between a closure of the upstream flowline and the pressure relief valve. Embodiments of the present application advantageously may provide a method for removing the trapped gas from the upstream flowline and moving it to the downstream flowline, thereby depressurizing the pressure relief valve. In some embodiments, the gas may be sent to a flaring system from the downstream flowline for disposal. FIG. 2 shows a method of depressurizing a pressure relief valve in accordance with embodiments of the present application.

Referring to FIGS. 1 and 2 together, the method of depressurizing the pressure relief valve 102 includes closing the inlet isolation valve 108 of the pressure relief valve system 100 located in the upstream segment of pipe 104 connected to the inlet 110 of the pressure relief valve 102, as shown at 250. Closing of the inlet isolation valve 108 isolates the pressure relief valve from the rest of the upstream flowline and may trap a volume of fluid, such as a gas, within the upstream segment of pipe 104 between the inlet isolation valve 108 and the inlet 110 of the pressure relief valve 102.

Once the inlet isolation valve 108 is closed, the upstream segment of pipe may be depressurized, as shown at 252. Specifically, depressurizing the upstream segment of pipe 104 includes opening the first tubing isolation valve 122 located in the tubing 116. As discussed above, the tubing 116 has the first end 118 connected to the upstream segment of pipe between the inlet isolation valve 108 and the pressure relief valve 102 and a second end connected to a downstream segment of pipe 106 connected to the outlet 114 of the pressure relief valve 102. Thus, when the first tubing isolation valve 122 is opened, the fluid trapped in the upstream segment of pipe 104 flows from the upstream segment of pipe 104 to the downstream segment of pipe 106, bypassing the pressure relief valve 102, and depressurizing the upstream segment of pipe 104 and the pressure relief valve 102.

The method of depressurizing the pressure relief valve 102 also includes monitoring a pressure in the tubing 116 with the gauge 124 connected to the tubing 116 between the first tubing isolation valve and the second end 120 of the tubing 116, as shown at 254. Monitoring of the pressure in the tubing 116 allows an operator to determine a pressure in the upstream segment of pipe 104 when the pressure relief valve 102 is isolated and to determine an amount of decrease in pressure, or depressurization, of the upstream segment of pipe 104.

Once the pressure in the tubing 116 has dropped a predetermined amount (change in pressure) or has dropped to a predetermined pressure, as measured by the gauge 124, then the outlet isolation valve 112 of the pressure relief valve system 100 located in the downstream segment of pipe 106 is closed, as shown at 256. In one or more embodiments, the predetermined pressure in the tubing 116 at which the outlet isolation valve 112 is then closed is 20 psig or lower. In some embodiments, the predetermined pressure in the tubing 116 at which the outlet isolation valve 112 is then closed is 15 psig or lower. In still other embodiments, the predetermined pressure in the tubing 116 at which the outlet isolation valve 112 is then closed is 10 psig or lower. The gauge 124 detects when the pressure in the tubing has dropped to the predetermined pressure, which is set to be indicative of a depressurized upstream segment of pipe 104 and pressure relief valve 102. Thus, pressurized fluid (e.g., pressurized gas) in the upstream segment of pipe 104 may be sent to the downstream segment of pipe 106 and further downstream to, for example, a flaring system 136 (i.e., depressurization of the pressure relief valve 102), before the pressure relief valve 102 is fully isolated (i.e., both the inlet isolation valve 108 and the outlet isolation valve 112 are closed).

Further, the method of depressurizing the pressure relief valve 102 may also include venting the pressurized fluid flowing through the tubing 116 from the upstream segment of pipe 104 to the downstream segment of pipe 106. The pressurized fluid may be vented from the tubing 116 by flowing the pressurized fluid past a vent 126 fixed in an open position. In one or more embodiments, the vent 126 may be fixed in an open position. In other embodiments, the vent may be configured to open at a preset opening pressure. In one or more embodiments, the vent 126 may be a valve that may be opened or closed. In accordance with embodiments disclosed herein, the vent 126 may be opened after the outlet isolation valve 112 is closed. In this manner, any fluid that remains in the tubing 116 once the pressure relief valve 102 is fully isolated may be vented to atmosphere at a low pressure. Once the pressure relief valve has been isolated, the pressure relief valve may be inspected, tested, repaired, or replaced as needed. To place the pressure relief valve 102 back online, the first tubing isolation valve 122 may be closed, and the inlet isolation valve 108 and the outlet isolation valve 112 may be opened.

The method of depressurizing the pressure relief valve may also include closing or opening one or more tubing isolation valves, such as second tubing isolation valve 132 and third tubing isolation valve 134. The second tubing isolation valve 132 may be closed to prevent fluid from the tubing 116 from flowing into the downstream segment of pipe 106. The third tubing isolation valve 134 may be closed or adjusted to prevent or limit flow through the gauge 124 in the tubing 116.

Embodiments disclosed herein include a method of providing or assembling a pressure relief valve system that is configured to allow for depressurization of the pressure relief valve system when the pressure relief valve is isolated from at least the upstream flowline. The method of assembly includes connecting an upstream segment of pipe to an inlet of a pressure relief valve and connecting an inlet isolation valve to the upstream segment of pipe. The method further includes connecting a downstream segment of pipe to an outlet of the pressure relief valve and connecting an outlet isolation valve to the downstream segment of pipe. The method also includes connecting a first end of a tubing to the upstream segment of pipe between the inlet isolation valve and the pressure relief valve and connecting a second end of the tubing to the downstream segment of pipe between the outlet isolation valve and the pressure relief valve. The method further includes connecting a first tubing isolation valve to the tubing. In one or more embodiments, the method further includes connecting a gauge to the tubing. The method may also include connecting a vent to the tubing between the gauge and a connection of the second end of tubing to the downstream segment of pipe. The method may also include connecting a second tubing isolation valve to the tubing proximate the second end of the tubing.

Embodiments of the present application advantageously may provide a pressure relief valve system and method of depressurizing a pressure relief valve that may reduce risks associated with isolation of safety relief valves. For example, embodiments disclosed herein may allow for trapped, pressurized gases to be flowed to a downstream end of the system to a flaring system rather than straight to atmosphere, which can be environmental harmful and unsafe for personnel. Embodiments disclosed herein advantageously may provide a method for removing the trapped gas from the upstream flowline and moving it to the downstream flowline, thereby depressurizing the pressure relief valve without personnel being exposed to vented pressurized gas.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed:

1. A method of depressurizing a pressure relief valve comprising:

- closing an inlet isolation valve of a pressure relief valve system located in an upstream segment of pipe connected to an inlet of the pressure relief valve;
- depressurizing the upstream segment of pipe, the depressurizing comprising opening a first tubing isolation valve located in a tubing having a first end connected to the upstream segment of pipe between the inlet isolation valve and the pressure relief valve and a second end connected to a downstream segment of pipe connected to an outlet of the pressure relief valve and flowing a pressurized gas from the upstream segment of pipe through the tubing to the downstream segment of pipe;
- monitoring a pressure in the tubing with a gauge connected to the tubing between the first tubing isolation valve and the second end of the tubing; and
- closing an outlet isolation valve of the pressure relief valve system located in the downstream segment of pipe when the pressure in the tubing is below a predetermined pressure.

2. The method of claim 1, further comprising opening a vent located in the tubing proximate the second end of the tubing after the closing the outlet isolation valve.

3. The method of claim 2, further comprising opening a second tubing isolation valve located in the tubing between the vent and a connection between the second end of the tubing and the downstream segment of pipe.

4. The method of claim 1, further comprising flowing the pressurized gas to a flaring system and flaring the pressurized gas.

5. The method of claim 1, wherein the predetermined pressure is 20 psig.

6. The method of claim 1, wherein the predetermined pressure is 10 psig.

7. The method of claim 6, further comprising opening the inlet isolation valve and opening the outlet isolation valve.

8. A method comprising:

- connecting an upstream segment of pipe to an inlet of a pressure relief valve;
- connecting an inlet isolation valve to the upstream segment of pipe;
- closing the inlet isolation valve;
- connecting a downstream segment of pipe to an outlet of the pressure relief valve;
- connecting an outlet isolation valve to the downstream segment of pipe;
- closing the outlet isolation valve when a pressure in the tubing is below a predetermined pressure;
- connecting a first end of a tubing to the upstream segment of pipe between the inlet isolation valve and the pressure relief valve;
- connecting a second end of the tubing to the downstream segment of pipe between the outlet isolation valve and the pressure relief valve;
- connecting a first tubing isolation valve to the tubing; and
- depressurizing the upstream segment of pipe by opening the first tubing isolation valve.

9. The method of claim 8, further comprising connecting a gauge to the tubing, and monitoring the pressure in the tubing with the gauge.

10. The method of claim 9, further comprising connecting a vent to the tubing between the gauge and a connection of the second end of tubing to the downstream segment of pipe.

11. The method of claim 8, further comprising connecting a second tubing isolation valve to the tubing proximate the second end of the tubing.

* * * * *